(12) United States Patent
Shah et al.

(10) Patent No.: US 6,788,668 B1
(45) Date of Patent: Sep. 7, 2004

(54) LOW POWER LONG CODE SYNCHRONIZATION SCHEME FOR SLEEP MODE OPERATION OF CDMA SYSTEMS

(75) Inventors: Yogendra Champaklal Shah, Morganville, NJ (US); Reza Aghazadeh-Alavi, Franklin Park, NJ (US); Karim Nassiri Toussi, San Jose, CA (US); Sharad D. Sambhwani, Bridgewater, NJ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/515,222

(22) Filed: Feb. 29, 2000

(51) Int. Cl.[7] .............................................. H04B 7/216
(52) U.S. Cl. ........................ 370/342; 370/337; 370/318; 370/503; 370/441; 455/522; 455/13.4; 375/130
(58) Field of Search ................................ 370/311, 324, 370/350, 335, 342, 320, 336, 328, 329, 441, 503, 510, 318, 337; 455/574, 522, 13.4, 127.1–5, 343.1; 375/130

(56) References Cited

U.S. PATENT DOCUMENTS

| | | | | |
|---|---|---|---|---|
| 5,596,571 A | * | 1/1997 | Gould et al. ................. | 370/335 |
| 5,708,658 A | * | 1/1998 | Sugita ......................... | 370/335 |
| 5,910,944 A | * | 6/1999 | Callicotte et al. ............ | 370/311 |
| 6,009,319 A | * | 12/1999 | Khullar et al. .............. | 340/7.38 |
| 6,016,312 A | * | 1/2000 | Storm et al. ................. | 370/311 |
| 6,088,602 A | * | 7/2000 | Banister ...................... | 455/574 |
| 6,128,332 A | * | 10/2000 | Fukawa et al. ............. | 375/146 |
| 6,141,669 A | * | 10/2000 | Carleton ...................... | 708/252 |
| 6,167,037 A | * | 12/2000 | Higuchi et al. .............. | 370/335 |
| 6,212,398 B1 | * | 4/2001 | Roberts et al. .............. | 455/502 |
| 6,282,181 B1 | * | 8/2001 | Stark et al. ................. | 370/335 |
| 6,411,830 B2 | * | 6/2002 | Alon et al. .................. | 455/574 |
| 6,453,181 B1 | * | 9/2002 | Challa et al. ............... | 455/574 |

* cited by examiner

*Primary Examiner*—Dang Ton
*Assistant Examiner*—Tri H. Phan
(74) *Attorney, Agent, or Firm*—Armstrong Teasdale LLP (57) ABSTRACT

In one embodiment, the present invention is a method for conserving power supplied to a linear feedback shift register (LFSR) long code (LC) generator, the method including steps of operating the LC generator during pre-assigned time slots; shutting off the LC generator during standby periods between the pre-assigned time slots; and priming starting states of the LC generator for synchronization with pre-assigned time slots following a standby period. This embodiment of the present invention enables power to be removed from the LFSR LC generator as well as the LFSR clock. Because the accuracy of the LFSR clock is usually derived from a system master transistor-controlled crystal oscillator (TCXO), and because the LFSR clock operates at a relatively high rate, the TCXO can also be powered down to conserve power. A low frequency, low power clock source can then be used instead of the higher powered clock source and TCXO to maintain operation of the mobile during the mobile sleep state.

20 Claims, 6 Drawing Sheets

LOW POWER LONG CODE SYNCHRONIZATION SCHEME FOR SLEEP MODE OPERATION OF CDMA SYSTEMS

BACKGROUND OF THE INVENTION

This invention relates generally to methods and apparatus for operating a wireless mobile station and more particularly to methods and apparatus for communicating with wireless mobile stations in which a paging channel is used to communicate to a plurality of such stations via a Code Division Multiple Access (CDMA) channel.

In a typical code division multiple access (CDMA) wireless system, a central base station transmits control information to many mobile stations by creating a multiplexed frame structure in which transmission time is divided into individual frames. Any given time slot may be devoted to information intended for an individual mobile station. This control channel structuring is often referred to as a "paging channel."

Those mobile stations which are not engaged in a conversation at any given time are in a standby mode. During the standby mode, a mobile station monitors a pre-assigned corresponding time slot of the paging channel transmitted by the base station for a paging channel message. Among other information that may be contained in the paging channel message, the mobile station may be informed whether an incoming call has arrived, to which channel the incoming call is allotted, and other information needed by the mobile station to prepare to receive the incoming call. In addition, during an assigned time slot, messages requiring action by the mobile station may be delivered.

Figure 1:
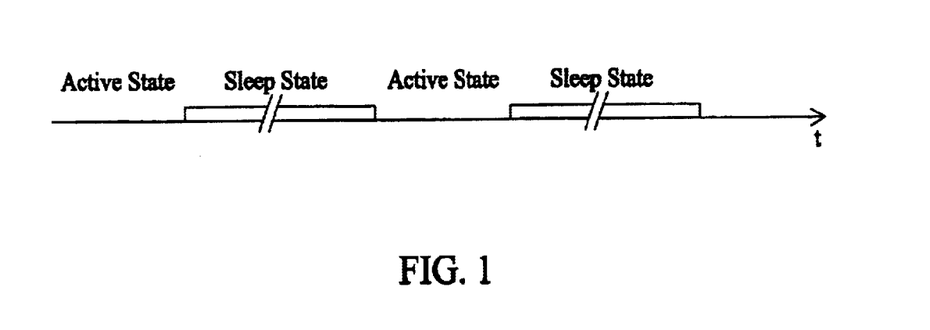
FIG. 1 is a simplified timing diagram for a wireless mobile station operating in an idle mode CDMA system.

A simplified timing diagram for a wireless mobile station operating in a CDMA system is shown in FIG. 1. To ensure receipt of a paging message, the mobile station enters an active state just prior to an assigned time slot, such as time $t_c$. During the time slot, the paging channel message may be received. However, time slots assigned to a mobile station are usually widely spaced in time. To conserve battery power, a mobile station in standby mode (i.e., not engaged in a call) enters a "sleep state" during the time between assigned time slots. During a sleep state, most functions of the mobile station are suspended until the mobile station must "wake up" (e.g., become active) to receive information (for example, a paging message) contained in the next assigned time slot. In this way, the mobile station is maintained in a standby mode, alternating between a sleep state and an active state until a paging channel message is received that informs the mobile station that an incoming call has arrived or until the user of the mobile station wishes to make a call.

To maintain synchronization with the base station, the mobile station maintains timing for a Linear Feedback Shift Register (LFSR), which runs continuously at the base station. The LFSR operates as a long code (LC) generator for CDMA operation. In known systems, the LFSR is maintained by a clock derived from a main temperature-controlled crystal oscillator (TCXO) or by a high accuracy crystal. Thus, power consumption of the mobile station remains relatively high, resulting in a low battery life. It would therefore be desirable to provide if the mobile station could be maintained in a sleep state with the LFSR and crystal oscillator shut off.

BRIEF SUMMARY OF THE INVENTION

There is therefore provided in one embodiment of the present invention a method for conserving power supplied to a linear feedback shift register (LFSR) long code (LC) generator, the method including steps of operating the LC generator during pre-assigned time slots; shutting off the LC generator during standby periods between the pre-assigned time slots; and priming starting states of the LC generator for synchronization with pre-assigned time slots following a standby period.

It will be appreciated that the above-described embodiment of the present invention enables power to be removed from the LFSR LC generator as well as the LFSR clock. Because the accuracy of the LFSR clock is usually derived from a system master TCXO, and because the LFSR clock operates at a relatively high rate, the TCXO can also be powered down to conserve power. A low frequency, low power clock source can then be used instead of the higher powered clock source and TCXO to maintain operation of the mobile during the mobile sleep state.

DETAILED DESCRIPTION OF THE INVENTION

In one embodiment of the present invention, the LFSR or long code generator (LC) is powered down at a mobile station and restored prior to demodulation of an assigned paging time slot from a base station.

Figure 2:
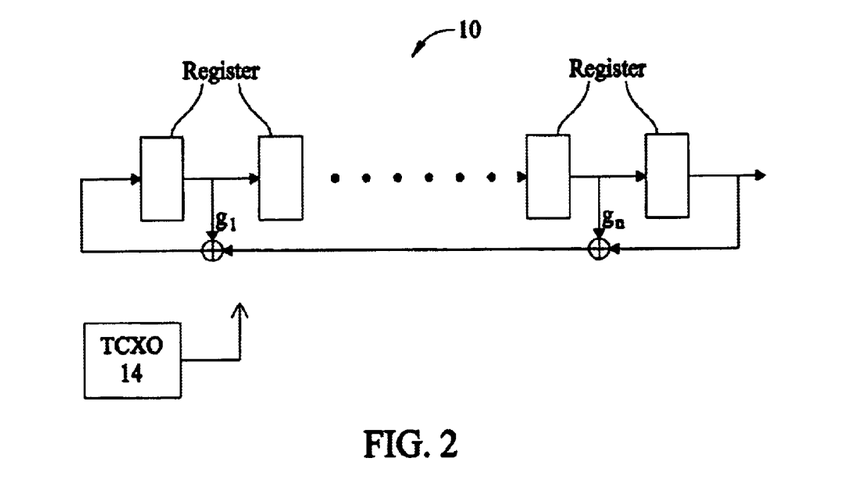
FIG. 2 is a block diagram of an exemplary Fibonacci generator.
Figure 3:
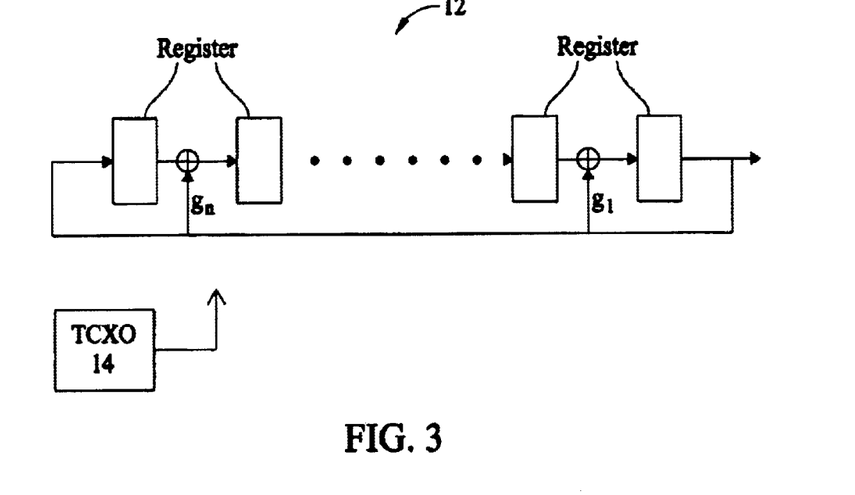
FIG. 3 is a block diagram of an exemplary Galois generator such as is typically specified in IS-95 systems to scramble sequences between a base station and a mobile station in a CDMA system.

A Linear Feedback Shift Register (LFSR) generates a "long code sequence generator" used to scramble transmissions between the base station and the mobile station for code division multiple access (CDMA) communication. Examples of a Fibonacci format LFSR 10 and Galois format LFSR 12 are shown in FIGS. 2 and 3, respectively. A sequence generated by the LFSR or a decimated version of it is used to scramble transmitted symbols in a modem. If the taps are chosen properly, repeated shifting (starting with any non-zero state) will cycle through every possible non-zero value of the register.

During a standby mode of operation of a mobile station, it is desirable to power down the long code generator, because the generator, whether it be a Fibonacci generator such as generator 10 or a Galois generator such as generator 12, operates at a relatively high clock speed. Generator 10 or 12 is driven by a crystal oscillator 14, and both generator 10 or 12, and oscillator 14 draw relatively large amounts of power. In one embodiment of the present invention, generator 10 is "primed," i.e., set up to start in an appropriate state in anticipation of starting up again at a known future time. In another embodiment, generator 12 is similarly "primed."

Figure 4:
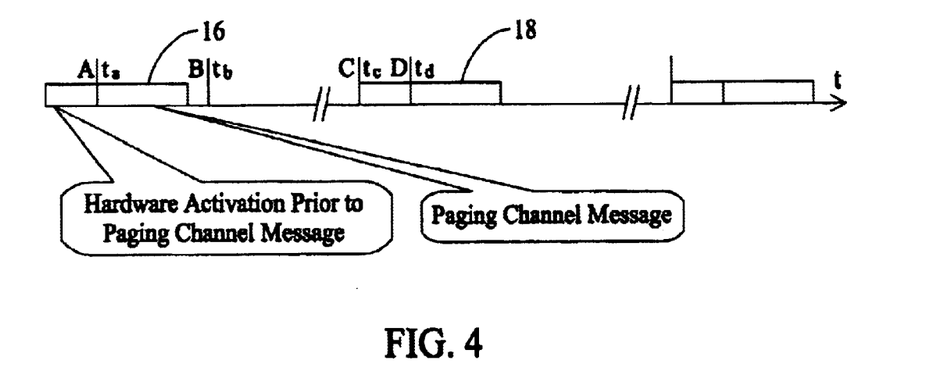
FIG. 4 is a simplified timing diagram for a wireless mobile station operating in a CDMA system in one embodiment of the present invention, showing resynchronization after a timing clock is cut off and later restored.

Initially, a state of LC generator 10 or 12 at a predetermined time is known based upon a timing acquisition process. In one embodiment of the present invention, the mobile station need not apply a clock 14 to LFSR 10 or 12 (whichever type is used) at all times to maintain LC synchronization. Instead, clock 14 is cut off while the mobile station is not receiving and/or transmitting. Referring to FIG. 4, LC 10 or 12 is resynchronized when clock 14 is cut off and restored at a later time. The following times are referred to in this description: $t_a$ and $t_d$ are times at the beginning of two consecutive assigned time slots 16 and 18; $t_b$ is a time when the mobile returns to sleep state, after assigned time slot 16 has been demodulated and its information content inspected; and $t_c$ is a time when the mobile returns to active state, re-acquires system timing and prepares to begin demodulation of assigned time slot 18.

To enable correct synchronized operation of the LC generator, whether a generator of Fibonacci type 10 or Galois type 12 is used, the mobile station obtains a state $S_a$ at time $t_a$, and computes and saves a state $S_d$ that is expected at time $t_d$. Thereafter, clock 14 is powered off by time $t_b$. At time $t_c$, power up occurs to enable re-acquisition of system timing and restoration of clock 14 to LC generator 10 or 12 and LC state $S_d$, and then demodulation of the assigned slot begins at time $t_d$.

In one embodiment, LC generator 12 state is restored in a manner illustrated by a simple example. An irreducible polynomial of degree 3 is used for generator 12 in this example to keep the example simple. The example selected presents the issues that one skilled in the art would face in practicing an embodiment of the present invention, yet is simple enough to discuss conveniently. However, neither the present invention nor the embodiments described herein are dependent upon selection of an irreducible polynomial of any particular degree. Those skilled in the art should have no difficulty extending the illustrative example presented herein to embodiments employing irreducible polynomials of degrees different from those in the example. In practical implementations, irreducible primitive polynomials of higher degree are more likely to be used, the degree and selection of the polynomial perhaps being dictated by conformance to a standard, or by a pre-existing specification, or by interoperability requirements.

Figure 5:
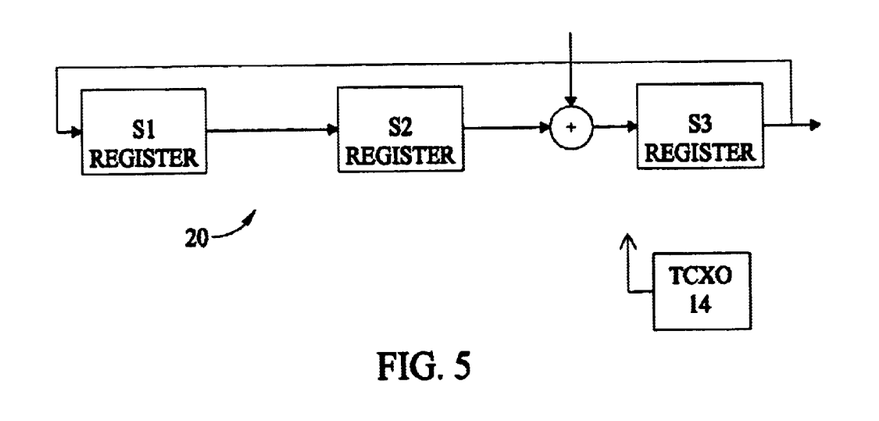
FIG. 5 is a simplified block diagram of a Galois generator implementing (i.e., mechanizing) an irreducible polynomial $f(x)=1+x+x^3$.
Figure 6:
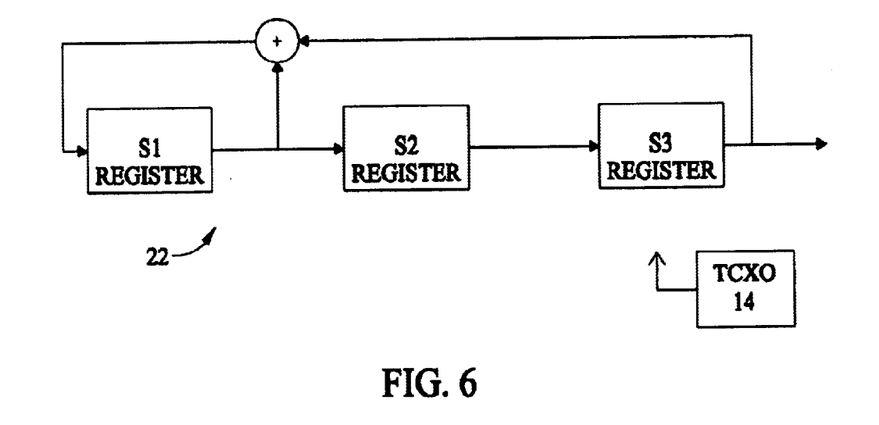
FIG. 6 is a simplified block diagram of a Fibonacci generator equivalent to the Galois generator of FIG. 5.

Let us consider the irreducible primitive polynomial $f(x)= 1+x+x^3$. For purposes of this explanation, let us also consider an implementation of a Galois generator 20 for this polynomial as shown in simplified block diagram form in FIG. 5. Prior to turning off generator 20, generator 20 and its current state $S_a$ are transformed, using a transformation T, to a Fibonacci generator 22 (shown in FIG. 6) at a corresponding state $S^*_a$. A computation is then performed to generate the desired future state $S^*_d$ of Fibonacci generator 22 (and hence, of corresponding Galois generator 20) using a pre-computed mask M, and then an inverse transform $T^{-1}$ is performed to transform state $S^*_d$ into Galois form $S_d$. Transformation T is selected so that a computed output sequence of both Fibonacci generator 22 and Galois generator 20 are the same. FIG. 6 is a simplified block diagram of a Fibonacci generator 22 equivalent to Galois generator 20.

A generator matrix for Fibonacci generator 22 is written as:

$$G_f = \begin{pmatrix} 0 & 1 & 0 \\ 0 & 0 & 1 \\ 1 & 0 & 1 \end{pmatrix},$$

while a generator matrix for corresponding Galois generator 20 is written as:

$$G_g = \begin{pmatrix} 1 & 1 & 0 \\ 0 & 0 & 1 \\ 1 & 0 & 0 \end{pmatrix}.$$

Both $G_f$ and $G_g$ are readily determined from their respective generator polynomials $f(x)$ and $g(x)$. Matrices $G_f$ and $G_g$ are related by a transformation matrix T by an equation written as:

$$G_f = T G_g T^{-1}.$$

Matrix T is readily determined, and in this example is written as:

$$T = \begin{pmatrix} 1 & 0 & 0 \\ 1 & 1 & 0 \\ 1 & 1 & 1 \end{pmatrix}.$$

States of Galois generator 20 as a function of clock 14 ticks are listed in Table I below.

TABLE I

States of a Galois Generator based on $f(x) = 1 + x + x^3$.

| Clock | $S_3 S_2 S_1$ |
|---|---|
| 0 | 0 0 1 |
| 1 | 0 1 0 |
| 2 | 1 0 0 |
| 3 | 1 0 1 |
| 4 | 1 1 1 |
| 5 | 0 1 1 |
| 6 | 1 1 0 |

For purposes of this example, let us assume that it is desired to switch clock 14 off at time t=0 for 3 cycles, so that the state to be preloaded is the state at time t=3. By inspection of Table I, the state at time t=0 and the desired time at t=3 for Galois generator 20 are $S_a=[0\ 0\ 1]^T$ and $S_d=[1\ 0\ 1]^T$, respectively, where $^T$ is the transportation operator. In one embodiment of the present invention, state $S_d$ is determined via a transformation to a Fibonacci generator 22. A corresponding Fibonacci generator state 22 at time t=0 is written as:

$$S_a^* = TS_a = \begin{pmatrix} 1 & 0 & 0 \\ 1 & 1 & 0 \\ 1 & 1 & 1 \end{pmatrix} \begin{pmatrix} 0 \\ 0 \\ 1 \end{pmatrix} = \begin{pmatrix} 0 \\ 0 \\ 1 \end{pmatrix}.$$

Figure 7:
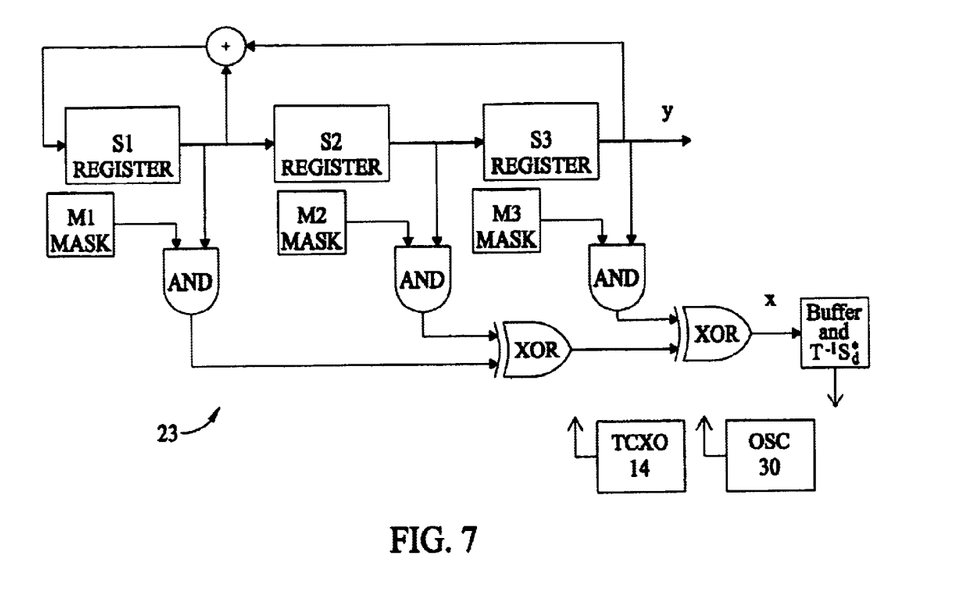
FIG. 7 is a simplified block diagram of a Fibonacci generator similar to that shown in FIG. 6 but also having a mask M=[M1 M2 M3] applied to generate an additional output x that is three phases or clock cycles in advance of standard output y.

The desired state after three clock 14 cycles is computed, in one embodiment, by loading $S^*_a$ in a masked version of Fibonacci generator 22, i.e., Fibonacci generator 23 shown in FIG. 7, and by observing an output x of masked Fibonacci generator 22 for 3 clock cycles. A mask M to advance a state of Fibonacci generator 23 by N cycles is computed from $M=[1\ 0\ 0].(G_f)^N$. Mask M provides a masked output x that corresponds to a phase-shifted version of the original output y from Fibonacci generator 23.

In the case of this example, when a mask M=[M1 M2 M3]=[1 0 1] is applied, the output x is three phases in advance of the output y, or in other words, x(t)=y(t+3).

Thus, if generator 23 shown in FIG. 7 is loaded with $S^*_a=[0\ 0\ 1]^T$, then for three clock cycles at masked output x, a sequence [1 1 0] is output. This output corresponds to a state of Fibonacci generator 23 of $S^*_a=[1\ 1\ 0]^T$ at time t=3. Finally, a transformation is performed to determine a state of Galois generator 20 at time t=3, the transformation being written as:

$$S_d = T^{-1} S_d^* = \begin{pmatrix} 1 & 0 & 0 \\ 1 & 1 & 0 \\ 1 & 1 & 1 \end{pmatrix}^{-1} \begin{pmatrix} 1 \\ 1 \\ 0 \end{pmatrix} = \begin{pmatrix} 1 \\ 0 \\ 1 \end{pmatrix},$$

which can be verified as being correct by reference to state $S_d$ at time t=3 in Table I.

In one embodiment in which a Galois generator (for example, Galois generator 20 of FIG. 5) is used an LC generator, a corresponding masked Fibonacci generator (for example, Fibonacci generator 23 of FIG. 7) is loaded with the same state as the Galois generator, and masked output x is buffered, transformed, and loaded into the Galois generator to prime a starting state of the Galois generator for synchronization with a pre-assigned time slot following a standby period. In this embodiment, it is not actually necessary to use or make available the y (i.e., standard) output of the Fibonacci generator to provide all of the circuitry necessary to make it available. Thus, in one embodiment, to advance the state of an LFSR of order M by N cycles, two state transformations are performed, a Fibonacci generator is run for M cycles, and a mask is used that corresponds to advancing the Fibonacci generator by N cycles.

In another embodiment in which a Fibonacci generator is used as an LC generator, no separate generator is required. The priming state is simply a suitably buffered masked output x of the Fibonacci LC generator.

Use of an irreducible polynomial of degree 3 for the exemplary embodiments described herein simplify an understanding of the invention but may make it more difficult to appreciate the advantages of the embodiments. These advantages will be much better appreciated if the fact that LC generators mechanizing much higher degree polynomials are generally used in CDMA systems is kept in mind.

Other embodiments of the present invention utilize a somewhat different approach to determine a future state of a generator. This approach has a advantage of generating a priming state without having to further buffer an output of an LFSR generator.

Consider two examples in which an irreducible primitive polynomial $f(x)=1+x^2+x^3$ defines the generator. In a first exemplary embodiment, a Fibonacci generator 24 is used to scramble the output of the mobile station. Fibonacci generator 24 for this polynomial is shown in simplified block diagram form in FIG. 8. In a second exemplary embodiment, a Galois generator is used to scramble the output of the mobile station. A Galois generator 21 for this polynomial is shown in simplified block diagram form in FIG. 9.

Figure 8:
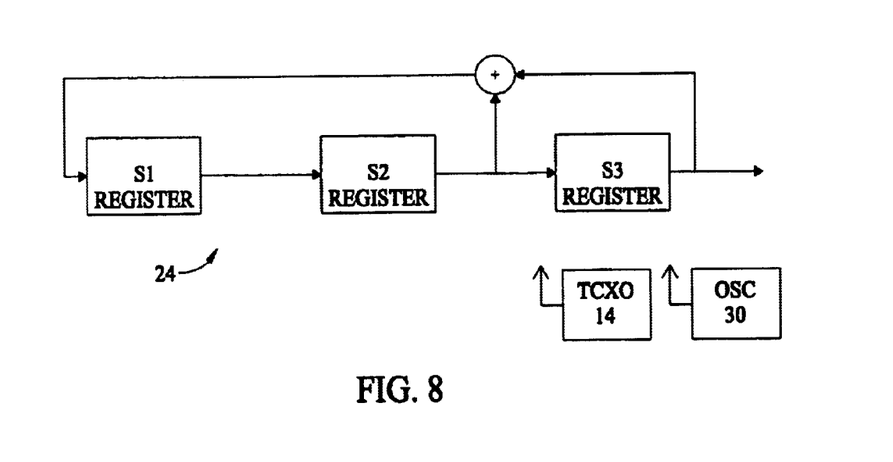
FIG. 8 is a simplified block diagram of a Fibonacci generator implementing (or mechanizing) an irreducible polynomial $f(x)=1+x^2+x^3$.

A generator matrix for Fibonacci generator 24 is written as:

$$G_f = \begin{pmatrix} 0 & 1 & 0 \\ 0 & 0 & 1 \\ 1 & 1 & 0 \end{pmatrix}.$$

Figure 9:
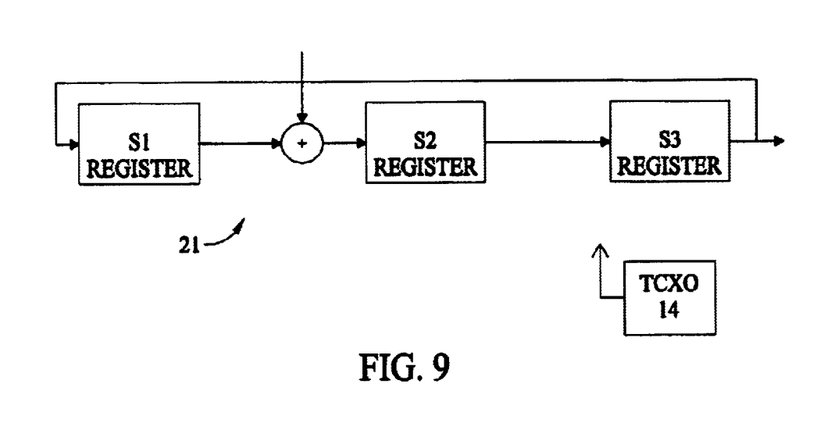
FIG. 9 is a simplified block diagram of a Galois generator implementing the same irreducible polynomial as the Fibonacci generator of FIG. 8.

A generator matrix for Galois generator 21 is written as:

$$G_g = \begin{pmatrix} 0 & 1 & 0 \\ 1 & 0 & 1 \\ 1 & 0 & 0 \end{pmatrix}.$$

States of Fibonacci generator 24 are listed in Table II below.

TABLE II

States of a Fibonacci Generator based on $f(x) = 1 + x^2 + x^3$.

| Clock | $S_3 S_2 S_1$ |
|---|---|
| 0 | 0 0 1 |
| 1 | 0 1 0 |
| 2 | 1 0 1 |
| 3 | 0 1 1 |
| 4 | 1 1 1 |
| 5 | 1 1 0 |
| 6 | 1 0 0 |

States of Galois generator 21 are listed in Table III below.

TABLE III

States of a Galois Generator based on $f(x) = 1 + x^2 + x^3$.

| Clock | $S_3 S_2 S_1$ |
|---|---|
| 0 | 0 0 1 |
| 1 | 0 1 0 |
| 2 | 1 0 0 |
| 3 | 0 1 1 |
| 4 | 1 1 0 |
| 5 | 1 1 1 |
| 6 | 1 0 1 |

Let us assume that clock 14 is to be switched off at time t=0 for three clock cycles, i.e., we want to determine the state to be loaded at time t=3. By inspection of Table II and Table III, the desired state of both Galois generator 21 and Fibonacci generator 24 is $S^*_d=[0\ 1\ 1]^T$. The state equation for generators 21 and 24 is written in the form:

$S(t+1)=GS(t)$.

Hence, a state transition of three time periods is written as:

$S(t+3)=G^3S(t)$.

Therefore, matrix $G_{3F}$ for Fibonacci generator 24 is written as:

$$G_{3F} = (G_f)^3 = \begin{pmatrix} 1 & 1 & 0 \\ 0 & 1 & 1 \\ 1 & 1 & 1 \end{pmatrix}.$$

Matrix $G_{3G}$ for Galois generator 21 is written as:

$$G_{3G} = (G_g)^3 = \begin{pmatrix} 1 & 1 & 0 \\ 1 & 1 & 1 \\ 1 & 0 & 1 \end{pmatrix}.$$

Figure 10:
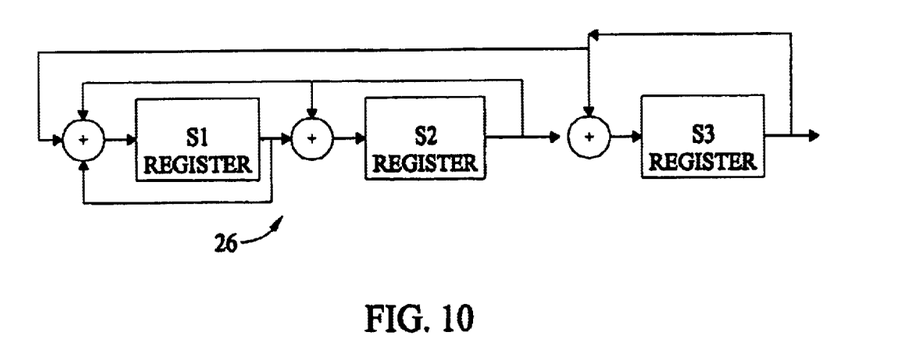
FIG. 10 is a simplified block diagram of an LFSR circuit that, with each sequential clock cycle, produces a state corresponding to an advance of a plural number (in this case, three) of clock cycles of the Fibonacci generator shown in FIG. 8.
Figure 11:
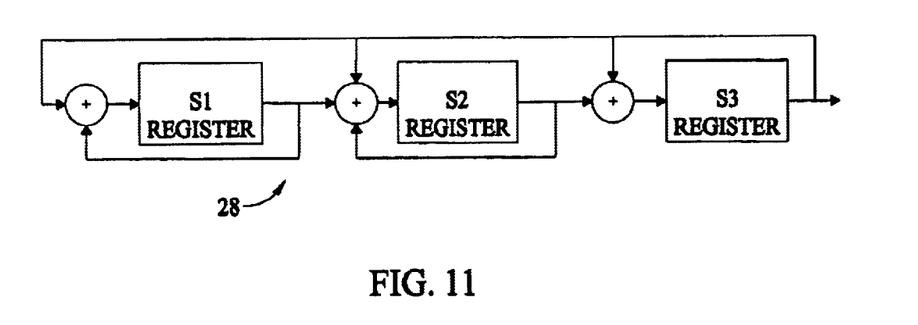
FIG. 11 is a simplified block diagram of an LFSR circuit that, with each sequential clock cycle, produces a state corresponding to an advance of a plural number (in this case, three) of clock cycles of the Galois generator shown in FIG. 9.

A priming LFSR circuit 26 due to $G_{3F}$ is shown in FIG. 10. A priming LFSR circuit 28 due to $G_{3G}$ is shown in FIG. 11. Note that neither circuit 26 nor circuit 28 is in Fibonacci or Galois form. However, circuits 26 and 28 are defined by and readily derived from the respective matrices $G_{3F}$ and $G_{3G}$.

Thus, in an embodiment utilizing Fibonacci generator 24, LFSR circuit 26 is loaded with the starting state (e.g., t=0) and clocked once to obtain the desired state (e.g., for this example, at t=3), or multiple times (for example, twice, to obtain desired states at t=6). When a desired state corresponding to an expected state at the beginning of the next assigned time slot is obtained, it is loaded into Fibonacci generator 24. For example, in one embodiment, each bit in a bit register of LFSR circuit 26 is copied into a corresponding bit in the bit register of Fibonacci LFSR 24. In another embodiment using Galois generator 21, LFSR circuit 28 is used in a corresponding manner, and its state is similarly copied into Galois generator 21. This copying primes the LC generators for synchronization at a pre-assigned time slot following a standby period.

In other embodiments, the functions of the generator circuit and the derived LFSR circuit are combined so that only one shift register is needed. Multiplexers are used as needed at the inputs of bit registers of the generator circuit to select between an output of a logic circuit representing a normal generator transition or the output of a logic circuit representing a derived LFSR circuit transition. Thus, one shift register is able to perform both the standard and the derived LFSR functions by operating in two different modes, one during the pre-assigned time slots, and the other during, for example, a portion of a standby period between pre-assigned time slots.

In many CDMA applications, times between active slots for a mobile station are selected or preselected from a sequence of times $2^n \times T_0$, where $T_0$ is a constant and n is a small integer, for example, an integer selected from the set $\{0, 1, 2, 3\}$. Thus, in one embodiment, a plurality of LFSR circuits are provided to compute a preload state for the LC generator, each LFSR circuit corresponding to a different possible n. A selection is made of which LFSR circuit to use for computing the preload state when the value of n is known. In another embodiment, a plurality of masks $M_n$ are provided on a Fibonacci generator such as that shown in FIG. 7, each mask $M_n$ corresponding to a different value of n. In still other embodiments, circuits such as LFSR circuits 26 or 28 are simply clocked $2^n$ times to produce the preload state needed for the LC generator.

In one embodiment, priming circuits in Fibonacci or Galois form that are equivalent to the priming LFSR circuits 26 and 28 are implemented. For example, in one embodiment, a Galois generator equivalent to $G_{3G}$ is determined, using a transform written as $TG_{3G}T^{-1}$. Transformation matrix T is determined using an expression written as:

$$T = [\,(G_{3G})^2.b \quad G_{3G}.b \quad b\,] = \begin{bmatrix} 1 & 0 & 0 \\ 0 & 1 & 0 \\ 1 & 1 & 1 \end{bmatrix},$$

and its inverse $T^{-1}$ happens to be equal to T, although that equality is merely a coincidence that resulted from use of the particular example selected for illustration. Here, we have:

$$b = \begin{bmatrix} 0 \\ 0 \\ 1 \end{bmatrix},$$

$$G_g = \begin{bmatrix} 0 & 1 & 0 \\ 1 & 0 & 1 \\ 1 & 0 & 0 \end{bmatrix}, \text{ and}$$

$$G_{3G} = \begin{bmatrix} 1 & 1 & 0 \\ 1 & 1 & 1 \\ 1 & 0 & 1 \end{bmatrix}.$$

The transformed Galois generator for this example happens to be generator 20 of FIG. 5. This generator is implemented as a priming generator rather than priming generator 28.

To use generator 20 as a priming generator for generator 21, an initial state $S_0$ of generator 21 is transformed by an equation written as:

$$S'_0 = T^{-1}S_0.$$

Generator 20 is loaded with state $S'_0$ and run as many cycles as needed, with each cycle of generator 20 representing 3 cycles of original generator 21 in this example. Next, final state $S'_d$ of generator 20 is transformed into desired state $S^*_d$ for priming generator 21 using a relationship written as:

$$S^*_d = TS'_d.$$

Thus, in this embodiment, only two transformations are performed, and a priming generator is run K clock cycles to prime the LC generator with a state advanced by Kn clock cycles of the LC generator. (In the examples used herein, n=3.)

It will thus be observed that embodiments of the present invention quickly prime either a Fibonacci or a Galois LC used for CDMA transmission for operation at a known future time. Each of the embodiments described herein produce a state corresponding to an advanced state of LC generator for priming the LC generator, but require far fewer clock cycles to do so than the LC generator itself. Thus, a mobile station using one or the other LFSR for this purpose employing an appropriate embodiment of the present invention is able to turn off the LFSR and its associated clock during all or most of each of the sleep or standby periods, yet quickly regain synchronization with a mobile station at the known future time. In particular, because fewer clocking cycles are needed to generate the priming state than would be needed for the LFSR LC generator to reach that state by itself, a slower, less power-consuming clock 30 may be used to operate circuitry efficiently designed to generate the priming state. Only one or more additional LFSRs and/or masks are needed to preload a Fibonacci or Galois LFSR used as a long code generator, along with simple additional circuitry to actually perform preloading of states. The additional LFSRs and circuitry require little additional hardware and/or room on an integrated circuit chip, and permit a future state of an LC generator to be rapidly determined and preloaded into the LC.

Embodiments of the invention described herein are useful not only in conjunction with mobile stations, but also to any other type of stations in which power conservation is important, or for which it is necessary or desirable for any other reason (e.g., to limit radio frequency interference) to shut down an LFSR during specified times and to restart the LFSR at a specific state corresponding to a particular future time.

While the invention has been described in terms of various specific embodiments, those skilled in the art will recognize that the invention can be practiced with modification within the spirit and scope of the claims.

What is claimed is:

1. A method for conserving power supplied to a linear feedback shift register (LFSR) long code (LC) generator, wherein the LC generator is a Fibonacci LFSR, said method comprising the steps of:
    operating the LC generator during pre-assigned time slots;
    shutting off the LC generator during standby periods between the pre-assigned time slots, a length of time between pre-assigned time slots selected from a plurality of time periods; and
    priming starting states of the LC generator with a second generator for synchronization with pre-assigned time slots following a standby period by:
       providing a plurality of masked outputs of the second generator, wherein the masked outputs correspond to different advanced states of the Fibonacci LFSR, each of the plurality of time periods having a corresponding said masked output;
       selecting a masked output corresponding to the selected length of time between assigned time slots;
       buffering the selected masked output of the second generator; and
       using the buffered, selected masked output to prime the Fibonacci LFSR for synchronization with the pre-assigned time slots following the standby periods.

2. A method in accordance with claim 1 wherein the LC generator is shifted using a high-speed clock during the pre-assigned time slots; and said method further comprises the step of shutting off the high-speed clock during standby periods between the assigned time slots.

3. A method in accordance with claim 4 wherein the LC generator is shifted using a high-speed clock during the pre-assigned time slots; and said method further comprises the step of shutting off the high-speed clock during standby periods between the assigned time slots.

4. A method for conserving power supplied to a linear feedback shift register (LFSR) long code (LC) generator, wherein the LC generator is a Galois LC generator, a length of time between pre-assigned time slots is selected from a plurality of time periods, where said method comprises the steps of:
    operating the Galois LC generator during pre-assigned time slots;
    shutting off the Galois LC generator during standby periods between the pre-assigned time slots, a length of time between pre-assigned time slots selected from a plurality of time periods; and
    priming starting states of the Galois LC generator with a second generator for synchronization with pre-assigned time slots following a standby period by:
       operating a Fibonacci LFSR configured to compute an output sequence identical to an output sequence of the Galois LC generator;
       providing a plurality of masked outputs of the Fibonacci LFSR wherein the masked outputs correspond to different advanced states of the Galois LC LFSR, each of the plurality of time periods having a corresponding said masked output;
       selecting a masked output corresponding to the selected length of time between assigned time slots;
       buffering the selected masked output of the Fibonacci LFSR; and
       using the buffered, selected masked output of the Fibonacci LFSR to prime the Galois LC for synchronization with the pre-assigned time slots following the standby periods.

5. A method in accordance with claim 1 wherein priming a starting state of the LC generator with a second generator further comprises the steps of:
    operating a priming LFSR generator configured to sequentially generate states corresponding to states of the LC generator separated by a predetermined plural number of clock cycles; and
    using one of the sequentially generated states of the priming LFSR generator to prime a starting state of the LC generator for synchronization with the pre-assigned time slots following the standby periods.

6. A method in accordance with claim 1 wherein a length of time between pre-assigned time slots is selected from a plurality of time periods, and priming a starting state of the LC generator with a second generator for synchronization with pre-assigned time slots following a standby period comprises the steps of:
    operating a plurality of priming LFSR generators configured to sequentially generate states corresponding to states of the LC generator separated by a predetermined plural number of clock cycles; each of the plurality of time periods having a corresponding said priming LFSR generator;
    using one of the sequentially generated states of one of said priming LFSR generators corresponding to the selected length of time between time slots to prime a starting state of the LC generator for synchronization with the pre-assigned time slots following the standby periods.

7. A method in accordance with claim 1 wherein the LC generator is operated in a first mode during the pre-assigned time slots, and wherein priming a starting state of the LC generator for synchronization with pre-assigned time slots following a standby period comprises the step of operating the LC generator in a second mode in which each successive state of the LC generator corresponds to an advancement of a plurality of states of the LC generator when operated in its first mode.

8. A method in accordance with claim 1 wherein operating the LC generator during pre-assigned time slots comprises the step of operating a high-speed clock; and wherein priming starting states of the LC generator with a second generator for synchronization with pre-assigned time slots following a standby period comprises the steps of shutting off the high-speed clock and operating a low-speed clock to generate the priming starting states.

9. A power-conserving long-code synchronizer, said synchronizer comprising a linear feedback shift register (LFSR) long code (LC) generator and a priming generator, wherein said LC generator is a Galois LC generator, and said priming generator comprises a Fibonacci LFSR generator configured to compute an output sequence identical to an output sequence of the Galois LC generator, said Fibonacci LFSR generator having at least one mask and a buffer, said at least one mask being configured to produce an output corresponding to an advanced state of said Galois LC generator, said synchronizer configured to:

operate said LC generator during pre-assigned time slots;

shut off said LC generator during standby periods between the pre-assigned time slots; and prime said LC generator with a starting state with the buffer of said Fibonacci LFSR generator for synchronization with pre-assigned time slots following a standby period with a masked output of said priming generator, said synchronizer further configured to:

operate said Fibonacci LFSR generator;

buffer a masked output of the Fibonacci LFSR, wherein the masked output corresponds to an advanced state of the Galois LC generator; and use the buffered masked output to prime the Galois LC generator for synchronization with the pre-assigned time slots following the standby periods.

10. A synchronizer in accordance with claim 9 wherein a length of time between pre-assigned time slots is selected from a plurality of time periods, said priming generator having a plurality of masks, said masks being configured to generate masked outputs corresponding to advanced states of said LC generator, each of said plurality of time periods corresponding to one of said masks, said synchronizer being configured to buffer one of said masked outputs of the Fibonacci LFSR corresponding to the selected length of time between assigned time slots.

11. A synchronizer in accordance with claim 9 further comprising a clock, said clock being configured to:

shift said LC generator during the pre-assigned time slots; and shut off during standby periods between the pre-assigned time slots.

12. A power-conserving long-code synchronizer, said synchronizer comprising a linear feedback shift register (LFSR) long code (LC) generator and a priming generator, said LC generator is a Galois LC generator, and said priming generator comprises a Fibonacci LFSR generator configured to compute an output sequence identical to an output sequence of said Galois LC generator, said Fibonacci LFSR Generator having a plurality of masks and corresponding buffers, each said mask being configured to produce an output corresponding to an advanced state of said Galois LC generator, said synchronizer configured to:

operate said LC generator during pre-assigned time slots;

shut off said LC generator during standby periods between the pre-assigned time slots; and prime said LC generator with a starting state for synchronization with pre-assigned time slots following a standby period with a masked output of said priming generator, wherein a length of time between pre-assigned time slots is selected from a plurality of time periods and each said time period has a corresponding masked output, said synchronizer further configured to:

operate said Fibonacci LFSR generator;

select a masked output corresponding to the selected length of time between assigned time slots;

buffer the selected masked output of the Fibonacci LFSR; and use the buffered, selected masked output to prime said Galois LC generator for synchronization with the pre-assigned time slots following the standby periods.

13. A synchronizer in accordance with claim 12 further comprising a clock, said clock being configured to:

shift said LC generator during the pre-assigned time slots; and shut off during standby periods between the assigned time slots.

14. A synchronizer in accordance with claim 9 wherein a length of time between pre-assigned time slots is selected from a plurality of time periods, said synchronizer further comprising a plurality of priming LFSR generators configured to sequentially generate states corresponding to states of the LC generator separated by predetermined plural numbers of clock cycles; each of the plurality of time periods having a corresponding said priming LFSR generator; and wherein said synchronizer being configured to prime a starting state of the LC generator for synchronization with pre-assigned time slots following a standby period comprises said synchronizer being configured to:

operate at least said priming LFSR generators corresponding to the selected length of time between time slots; and use one of the sequentially generated states of said LFSR generator corresponding to the selected length of time between time slots to prime a starting state of said LC generator for synchronization with the pre-assigned time slots following the standby periods.

15. A synchronizer in accordance with claim 9 wherein said LC generator is configured to operate in a first mode during the pre-assigned time slots, and wherein said priming generator being configured to prime a starting state of said LC generator for synchronization with pre-assigned time slots following a standby period comprises said synchronizer being configured to operate said LC generator in a second mode in which each successive state of said LC generator corresponds to an advancement of a plurality of states of said LC generator when operated in its first mode.

16. A synchronizer in accordance with claim 9 further comprising a high-speed clock configured to operate the LC generator during the pre-assigned time slots; and a low-speed clock configured to generate priming starting states of the LC generator with said priming generator for synchronization with pre-assigned time slots following a standby period, and further wherein the high-speed clock is configured to shut off during standby periods between the pre-assigned time slots.

17. A method in accordance with claim 4 wherein priming a starting state of the LC generator with a second generator further comprises the steps of:

operating a priming LFSR generator configured to sequentially generate states corresponding to states of the LC generator separated by a predetermined plural number of clock cycles; and using one of the sequentially generated states of the priming LFSR generator to prime a starting state of the LC generator for synchronization with the pre-assigned time slots following the standby periods.

18. A method in accordance with claim 4 wherein a length of time between pre-assigned time slots is selected from a plurality of time periods, and priming a starting state of the LC generator with a second generator for synchronization with pre-assigned time slots following a standby period comprises the steps of:

operating a plurality of priming LFSR generators configured to sequentially generate states corresponding to states of the LC generator separated by a predetermined plural number of clock cycles; each of the plurality of time periods having a corresponding said priming LFSR generator;

using one of the sequentially generated states of one of said priming LFSR generators corresponding to the selected length of time between time slots to prime a starting state of the LC generator for synchronization with the pre-assigned time slots following the standby periods.

19. A method in accordance with claim 4 wherein the LC generator is operated in a first mode during the pre-assigned time slots, and wherein priming a starting state of the LC generator for synchronization with pre-assigned time slots following a standby period comprises the step of operating the LC generator in a second mode in which each successive state of the LC generator corresponds to an advancement of a plurality of states of the LC generator when operated in its first mode.

20. A method in accordance with claim 4 wherein operating the LC generator during pre-assigned time slots comprises the step of operating a high-speed clock; and wherein priming starting states of the LC generator with a second generator for synchronization with pre-assigned time slots following a standby period comprises the steps of shutting off the high-speed clock and operating a low-speed clock to generate the priming starting states.

* * * * *